United States Patent
Hu

(10) Patent No.: US 9,312,903 B2
(45) Date of Patent: Apr. 12, 2016

(54) ELECTRONIC CARD CONNECTOR AND ELECTRONIC DEVICE USING THE SAME

(71) Applicant: ScienBiziP Consulting (Shen Zhen) Co., Ltd., Shenzhen (CN)

(72) Inventor: Chia-Jui Hu, New Taipei (TW)

(73) Assignee: ScienBiziP Consulting (Shenzhen) Co.,Ltd., Shenzhen (CN)

( * ) Notice: Subject to any disclaimer, the term of this patent is extended or adjusted under 35 U.S.C. 154(b) by 0 days.

(21) Appl. No.: 14/522,221

(22) Filed: Oct. 23, 2014

(65) Prior Publication Data

US 2015/0156911 A1     Jun. 4, 2015

(30) Foreign Application Priority Data

Nov. 30, 2013  (CN) .......................... 2013 1 0622636

(51) Int. Cl.
*H05K 5/00* (2006.01)
*H04B 1/3818* (2015.01)
*G06K 13/08* (2006.01)

(52) U.S. Cl.
CPC .......... *H04B 1/3818* (2015.01); *G06K 13/0806* (2013.01)

(58) Field of Classification Search
USPC .................................. 361/754, 752, 755, 756
See application file for complete search history.

(56) References Cited

U.S. PATENT DOCUMENTS 7,301,777 B2 * 11/2007 Fan .......................... G06F 1/184
                                                    361/679.55
8,730,680 B2 *  5/2014 Tang .................. G06K 13/0825
                                                    361/737

* cited by examiner

*Primary Examiner* — Andargie M Aychillhum
(74) *Attorney, Agent, or Firm* — Novak Druce Connolly Bove + Quigg LLP

(57) ABSTRACT

An electronic card connector includes a tray, a press member and a fixing member. The tray defines a defined space for accommodating an electronic card and a notch. The press member is slidably attached to a supporting wall. The press member includes a press body and a geared rack fixed to the press body. The geared rack includes a number of first gears protruding therefrom. The fixing member is rotatably attached to the supporting wall. The fixing member includes a geared portion and a hook protruding from the geared portion. The geared portion includes a number of second gears meshing with the first gears. The hook is capable of being received in the notch to engage the tray with the housing. The fixing member is driven to rotate by the press member to move out from the notch to disengage the tray from the housing.

18 Claims, 4 Drawing Sheets

ELECTRONIC CARD CONNECTOR AND ELECTRONIC DEVICE USING THE SAME

FIELD

The subject matter herein generally relates to electronic card connectors, especially to an electronic card connector and an electronic device using the same.

BACKGROUND

Electronic card connectors, such as Subscriber Identity Model card (SIM card), Secure Digital Memory Card (SD card) or the like, can be inserted into an electronic device, so that the electronic device can communicate with other electronic devices or store information.

BRIEF DESCRIPTION OF THE DRAWINGS

Many aspects of the present disclosure are better understood with reference to the follow drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
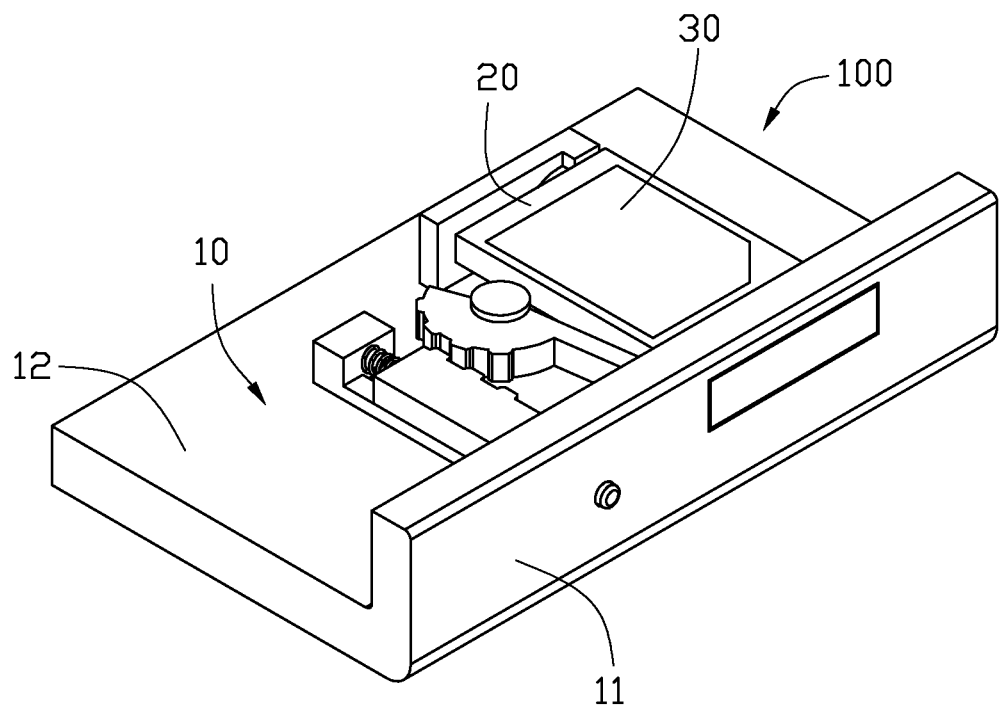
FIG. 1 is an isometric view of an embodiment of an electronic device having an electronic card connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
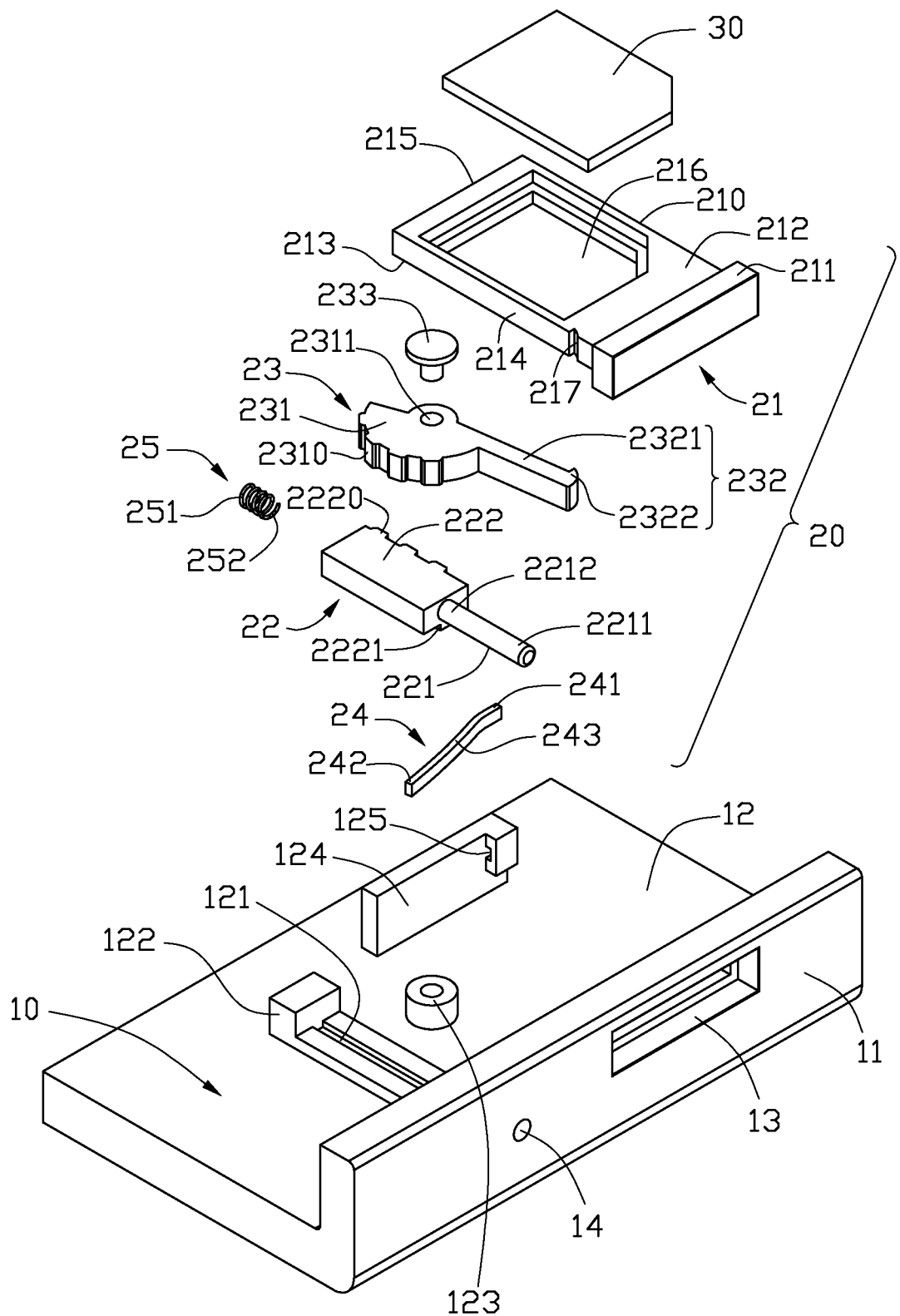
FIG. 2 is an exploded isometric view of the electronic device shown in FIG. 1.

FIGS. 1 and 2 show an electronic device 100. The electronic device 100 can include a housing 10 and an electronic card connector 20. The electronic device 100 can also include other functional modules to fulfill different functions; however, it is not shown and specifically described for simplification.

The housing 10 can include a peripheral sidewall 11, a supporting wall 12 and other peripheral sidewalls (not shown). The peripheral sidewall 11, the supporting wall 12 and the other peripheral sidewalls can cooperatively define an accommodating space 10. The accommodating space 10 can be used for accommodating the electronic card connector 20. The peripheral wall 11 can define a first through hole 13 and a second through hole 14.

The electronic card connector 20 can include a tray 21, a press member 22, a fixing member 23, an elastic member 24, and a return member 25.

The tray 21 can include a tray body 210 and a shoulder 211 protruding from one end of the tray body 210. The tray body 210 can have an upper surface 212, a lower surface 213 opposite to the upper surface 212, a first sidewall 214 coupling the upper surface 212 to the lower surface 213, and a second wall (not labeled) opposite to the first sidewall 214, substantially parallel to the first sidewall 214 and coupling the upper surface 212 to the lower surface 213, and an end 215 away from the shoulder 211. The tray body 210 can define a defined space 216 on the upper surface 212 for accommodating an electronic card 30. The tray body 210 can define a notch 217 on the first sidewall 214. The notch 217 can be located on one end of the first sidewall 214 close to the shoulder 211. The tray body 210 can pass through the first through hole 13 to accommodate in the accommodating space 10, and the shoulder 211 can be thus received in the first through hole 13.

The press member 22 can be slidably attached to the supporting wall 12. A sliding direction of the press member 22 can be substantially perpendicular to the peripheral sidewall 11. The press member 22 can include a press body 221 and a geared rack 222 fixed on one end of the press body 221. The press body 221 can include a first end 2211 and a second end 2212 opposite to the first end 2211. The first end 2211 can pass through the second through hole 14 to expose out of the housing 10. The second end 2212 can be fixed to one end of the geared rack 222 close to the peripheral sidewall 11. The geared rack 222 can include a number of first gears 2220 protruding from one side of the press body 221 close to the tray 21.

The geared rack 222 can further include a guiding rail 2221 protruding from one side of the geared rack 222 facing the supporting wall 12. The supporting wall 12 can further define a guide slot 121 corresponding to the guiding rail 2221. The guiding rail 2221 can accommodate into the guide slot 121 and slide along the guide slot 121 with the guide of the guide slot 121. The supporting wall 12 can further include a first limit portion 122 protruding therefrom. The press member 22 can be located between the peripheral sidewall 11 and the first limit portion 122. The sliding range of the press member 22 can be limited by the peripheral sidewall 11 and the first limit portion 122.

The fixing member 23 can be rotatably attached to the supporting wall 12. The fixing member 23 can include a geared portion 231 and a hook 232 protruding from the geared portion 231. The geared portion 231 can include a number of second gears 2310. The second gears 2310 can mesh with the first gears 2220.

The geared portion 231 can define a third through hole 2311. The supporting wall 12 can include a protrusion 123 protruding therefrom. The fixing member 23 can further include a screw 233. The screw 233 can pass through the third through hole 2311 to engage the fixing member 23 with the protrusion 123. In the illustrated embodiment, the geared portion 231 is semi-cylinder shaped. The hook 232 can include a connecting arm 2321 and a hook body 2322. The connecting arm 2321 can connect the hook body 2322 with the geared portion 231. When the tray 21 can be accommodated in the first accommodating space 10, the hook body 2322 can be received in the notch 217 to engage the tray 21 with the housing 10.

The supporting wall 12 can further include a second limit portion 124 protruding therefrom. The second limit portion 124 can define a slot 125. The elastic member 24 can be located between the second limit portion 124 and the end 215. The elastic member 24 can include a fixing portion 241, a resisting portion 242 and a connecting portion 243 connecting the fixing portion 241 with the resisting portion 242. The fixing portion 241 can be received in the slot 125. The resisting portion 242 can resist the end 215.

In the illustrated embodiment, the elastic member 24 is substantially S-shaped. The fixing portion 241 can be substantially parallel to the resisting portion 242. The connecting portion 243 can be slantwise connecting the fixing portion 241 with the resisting portion 242. In at least one embodiment, the elastic member 24 can be an arc-shaped elastic element, or a spring, or other suitable elastic member. The fixing portion 241 can be fixed to the second limit portion 124 by other ways. Furthermore, the second limit portion 124 can be omitted, and the fixing portion 241 can be fixed to the supporting wall 12 directly.

The return member 25 can be located between the first limit portion 122 and the geared rack 222. The return member 25 can have a third end 251 and a fourth end 252 opposite to the third end 251. The third end 251 can resist the first limit portion 122. The fourth end 252 can resist the geared rack 222. In at least one embodiment, the first limit portion 122 can be omitted, and the third end 251 can be fixed on the supporting wall 12 directly.

Figure 3:
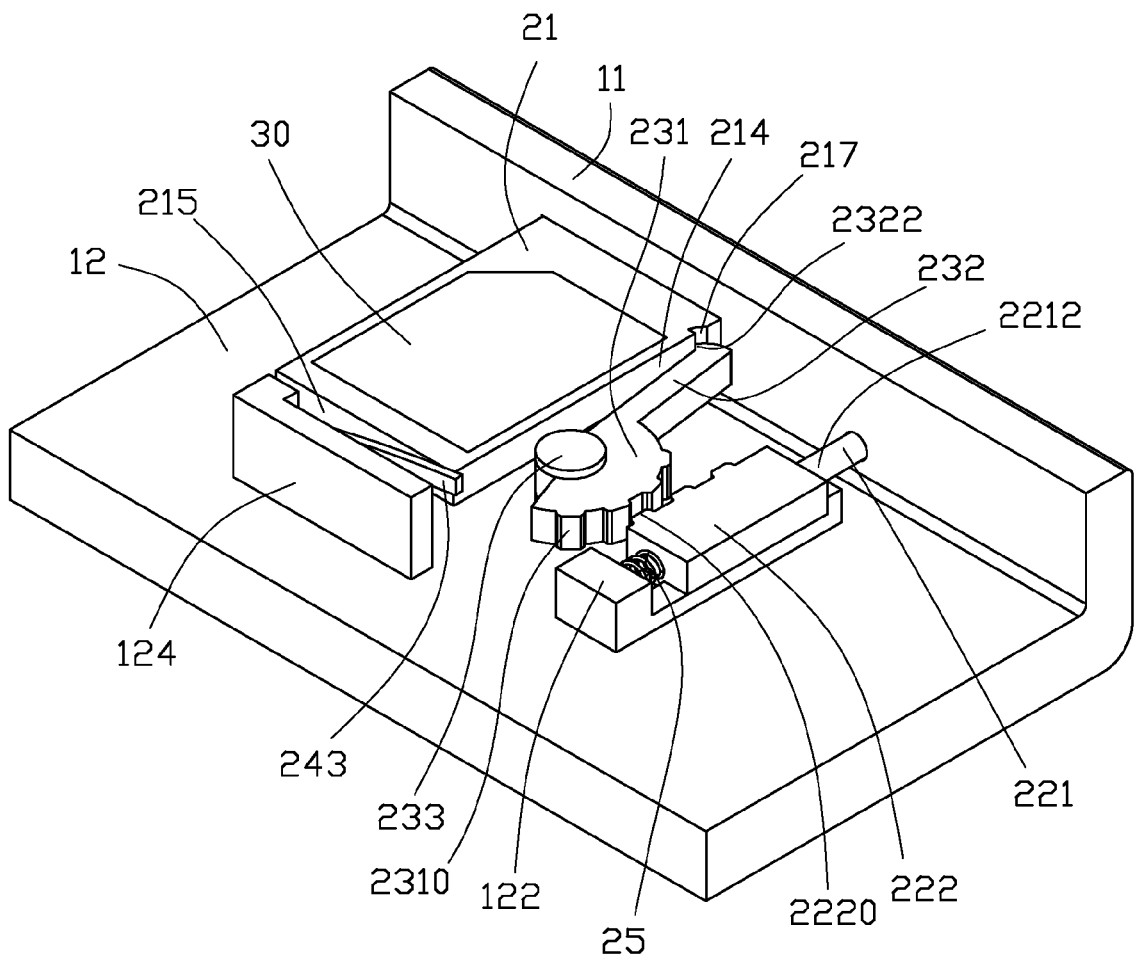
FIG. 3 is an isometric view of the electronic device shown in FIG. 1 in a first state.

As shown in FIG. 3, when in assembly, the press member 22 can be mounted between the peripheral sidewall 11 and the first limit portion 122, and the first end 2211 can pass through the second through hole 14 to expose out of the housing 10, and the return member 25 can be located between the first limit portion 122 and the geared rack 222; a screw 233 can pass through the third through hole 2311 to engage the fixing member 23 with the protrusion 123, and the second gears 2310 can be meshed with the first gears 2220; the tray body 210 can pass through the first through hole 13 to accommodate in the accommodating space 10, and the shoulder 211 can be thus received in the first through hole 13; the fixing portion 241 can receive in the slot 125 to engage the tray 21 with the housing 10.

Figure 4:
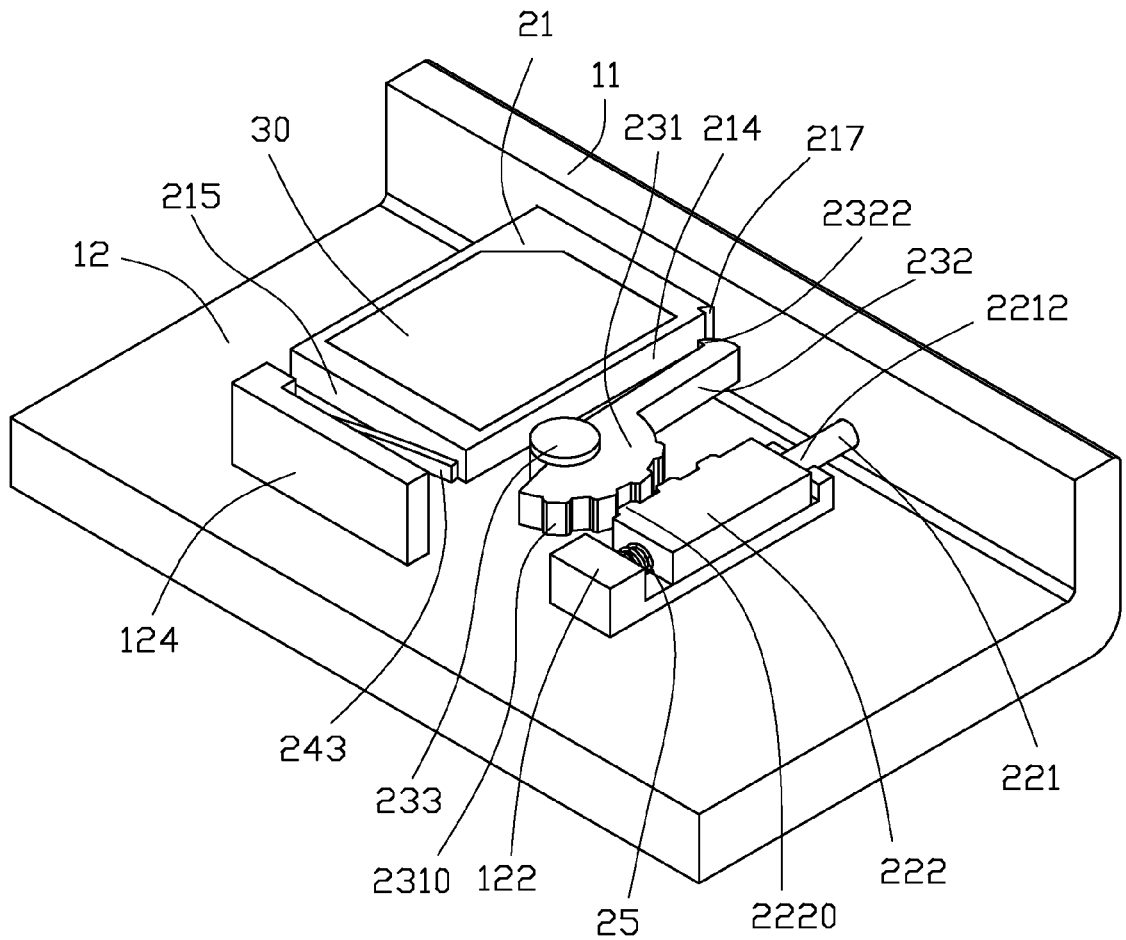
FIG. 4 is an isometric view of the electronic device shown in FIG. 1 in a second state.

As shown in FIG. 4, when a pressure is applied on the first end 2211, the press member 22 can move along a direction substantially perpendicular to the peripheral sidewall 11 and towards the first limit portion 122. The movement of the press member 22 causes the rotation of the fixing member 23 along a direction of clockwise. What the result of the rotation of the fixing member 23 is that the fixing portion 241 disengages from the notch 217. When the fixing portion 231 disengages from the notch 217, the elastic restoring force of the elastic member 24 ejects the tray 21 from the accommodating space 10. At this time, the return member 25 is depressed.

The elastic restoring force of the return member 25 can drive the press member 22 to move along a direction substantially perpendicular to the peripheral sidewall 11 and towards the peripheral sidewall 11. The movement of the press member 22 causes the rotation of the fixing member 23 along a direction of anticlockwise. What the result of the rotation of the fixing member 23 is that the fixing portion 241 return the original location. If the tray 21 passes through the first through hole 13 to accommodate in the accommodating space 10, the fixing portion 241 can receive in the notch 217 to engage the tray 21 with the housing 10.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An electronic device comprising:
    a housing having a supporting wall and a peripheral sidewall which cooperatively define an accommodating space, and the peripheral sidewall defining a first through hole and a second through hole; and
    an electronic card connector, the electronic card connector comprising:
    a tray comprising a tray body, the tray body defining a defined space for accommodating an electronic card and a notch, the tray body passing through the first through hole to accommodate in the accommodating space;
    a press member slidably attached to the supporting wall and a sliding direction of the press member being substantially perpendicular to the one of the plurality of peripheral sidewalls, the press member comprising a press body and a geared rack, the press body having a first end pass through the second through hole to expose out the housing and a second end fixed to one end of the geared rack close to the peripheral sidewall, the geared rack comprising a plurality of first gears protruding from the press body; and
    a fixing member rotatably attached to the supporting wall, the fixing member comprising a geared portion and a hook protruding from the geared portion, the geared portion comprising a plurality of second gears meshing with the first gears, and the hook received in the notch to engage the tray with the housing,
    wherein when the press member is driven to move in the second through hole along the sliding direction to away from the peripheral sidewall, the fixing member is driven to rotate to move out from the notch to disengage the tray from the housing.

2. The electronic device as described in claim 1, wherein the supporting wall comprises a first limit portion protruding therefrom, and the press member is located between the peripheral sidewall and the first limit portion.

3. The electronic device as described in claim 2, wherein the electronic card connector further comprises a return member, the return member has a third end and a fourth end opposite to the third end, the third end resists the first limit portion, and the fourth end resists the geared rack.

4. The electronic device as described in claim 1, wherein the geared rack comprises a guiding rail protruding from one side of the geared rack facing the supporting wall, the supporting wall defines a guide slot corresponding to the guiding rail, the guiding rail accommodates into the guide slot and slide along the guide slot with the guide of the guide slot.

5. The electronic device as described in claim 1, wherein the elastic member has a fixing portion, a resisting portion and a connecting portion connecting the fixing portion with the resisting portion, the fixing portion is fixed to the supporting wall and the resisting portion resists an end of the tray away from the peripheral sidewall.

6. The electronic device as described in claim 5, wherein the supporting wall comprises a second limit portion protruding therefrom, the fixing portion is fixed to the second limit portion.

7. The electronic device as described in claim 6, wherein the second limit portion defines a slot, the fixing portion receives in the slot to fix on the second limit portion.

8. The electronic device as described in claim 1, wherein the geared portion defines a third through hole, the supporting wall comprises a protrusion protruding therefrom, the fixing member comprises a screw, and the screw passes through the third through hole to engage the fixing member with the protrusion.

9. The electronic device as described in claim 1, wherein the hook comprises a connecting arm and a hook body, the connecting arm connects the hook body with the geared portion, the hook body is capable of being received in the notch to engage the tray with the housing.

10. An electronic card connector, applied on an electronic device, the electronic device comprising a housing having a supporting wall and a peripheral sidewall, which cooperatively define an accommodating space, the peripheral sidewall defining a first through hole and a second through hole; the electronic card connector comprising
a tray comprising a tray body, the tray body defining a defined space for accommodating an electronic card and a notch, the tray body passing through the first through hole to accommodate in the accommodating space;
a press member slidably attached to the supporting wall and a sliding direction of the press member being substantially perpendicular to the peripheral sidewall, the press member comprising a press body and a geared rack, the press body having a first end pass through the second through hole to expose out the housing and a second end fixed to one end of the geared rack close to the peripheral sidewall, the geared rack comprising a plurality of first gears protruding from the press body; and
a fixing member rotatably attached to the supporting wall, the fixing member comprising a geared portion and a hook protruding from the geared portion, the geared portion comprising a plurality of second gears meshing with the first gears, and the hook received in the notch to engage the tray with the housing;
when the press member is driven to move in the second through hole along the sliding direction to away from the peripheral sidewall, the fixing member is driven to rotate to move out from the notch to disengage the tray from the housing.

11. The electronic card connector as described in claim 10, wherein the supporting wall comprises a first limit portion protruding therefrom, and the press member is located between the peripheral sidewall and the first limit portion.

12. The electronic card connector as described in claim 10, wherein the electronic card connector further comprises a return member, the return member has a third end and a fourth end opposite to the third end, the third end resists the first limit portion, and the fourth end resists the geared rack.

13. The electronic card connector as described in claim 10, wherein the geared rack comprises a guiding rail protruding from one side of the geared rack facing the supporting wall, the supporting wall defines a guide slot corresponding to the guiding rail, the guiding rail accommodates into the guide slot and slide along the guide slot with the guide of the guide slot.

14. The electronic card connector as described in claim 10, wherein the elastic member has a fixing portion, a resisting portion and a connecting portion connecting the fixing portion with the resisting portion, the fixing portion is fixed to the supporting wall and the resisting portion resists an end of the tray away from the peripheral sidewall.

15. The electronic card connector as described in claim 14, wherein the supporting wall comprises a second limit portion protruding therefrom, the fixing portion is fixed to the second limit portion.

16. The electronic card connector as described in claim 15, wherein the second limit portion defines a slot, the fixing portion receives in the slot to fix on the second limit portion.

17. The electronic card connector as described in claim 10, wherein the geared portion defines a third through hole, the supporting wall comprises a protrusion protruding therefrom, the fixing member comprises a screw, and the screw passes through the third through hole to engage the fixing member with the protrusion.

18. The electronic card connector as described in claim 10, wherein the hook comprises a connecting arm and a hook body, the connecting arm connects the hook body with the geared portion, the hook body is capable of being received in the notch to engage the tray with the housing.

* * * * *